(12) United States Patent
Bahrs et al.

(10) Patent No.: US 10,944,790 B2
(45) Date of Patent: Mar. 9, 2021

(54) SYSTEM TO PREVENT SCAMS

(71) Applicant: International Business Machines Corporation, Armonk, NY (US)

(72) Inventors: Peter C. Bahrs, Georgetown, TX (US); David E. Blyler, Wilmington, NC (US); Cesar Augusto Rodriguez Bravo, Alajuela (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

(21) Appl. No.: 15/811,558

(22) Filed: Nov. 13, 2017

(65) Prior Publication Data
US 2019/0149575 A1    May 16, 2019

(51) Int. Cl.
*G06F 21/56* (2013.01)
*G06F 21/51* (2013.01)
(Continued)

(52) U.S. Cl.
CPC .......... *H04L 63/1491* (2013.01); *G06F 21/56* (2013.01); *G06N 20/00* (2019.01);
(Continued)

(58) Field of Classification Search
CPC ......... H04L 51/12; H04L 51/00; G06F 21/51; G06F 21/56; G06F 2221/2119
See application file for complete search history.

(56) References Cited

U.S. PATENT DOCUMENTS

| 7,917,593 B1 * | 3/2011 | Lee | ...................... G06Q 10/107 709/206 |
| 8,874,658 B1 * | 10/2014 | Khalsa | ................... H04L 51/12 709/206 |

(Continued)

OTHER PUBLICATIONS

Thomas, K. et al, "Trafficking Fraudulent Accounts; The Role of the Underground Market in Twitter Spam and Abuse", Aug. 14-16, 2013, Proceedings of the 22nd USENIX Security Symposium, pp. 195-210 (Year: 2013).*

(Continued)

*Primary Examiner* — Daniel B Potratz
(74) *Attorney, Agent, or Firm* — Law Offices of Ira D. Blecker, P.C.

(57) ABSTRACT

A computer-implemented method for deterring scams including: monitoring by a cognitive engine agent incoming messages for scam messages; receiving by a messaging server an incoming message having a sender of the incoming message; identifying by the cognitive engine agent the incoming message as a scam message; and replying by the cognitive engine agent in cooperation with the message server to the scam message by initiating a message conversation with the sender of the scam message, the message conversation including one or more reply messages to the sender of the scam message replying to the scam message and any subsequent scam messages from the sender of the scam message with each reply message being an intelligent, interactive message using natural unscripted language to appear as if the one or more reply messages was written by a human and is responsive to a content of a scam embodied in the scam message.

14 Claims, 5 Drawing Sheets

(51) Int. Cl.
*H04L 29/06* (2006.01)
*H04L 12/58* (2006.01)
*G06N 20/00* (2019.01)

(52) U.S. Cl.
CPC .............. *H04L 51/02* (2013.01); *H04L 51/12* (2013.01); *H04L 51/30* (2013.01); *H04L 63/1408* (2013.01); *G06F 21/51* (2013.01)

(56) References Cited

U.S. PATENT DOCUMENTS

| | | | |
|---|---|---|---|
| 10,482,437 B2* | 11/2019 | Groarke | G06Q 20/4016 |
| 2007/0294762 A1 | 12/2007 | Shraim et al. | |
| 2016/0119377 A1* | 4/2016 | Goldberg | G06F 40/40 |
| | | | 726/12 |
| 2018/0240473 A1* | 8/2018 | Baracaldo Angel | G06N 20/00 |
| 2019/0014064 A1* | 1/2019 | Strauss | G06N 20/00 |
| 2020/0067861 A1* | 2/2020 | Leddy | H04L 51/12 |

OTHER PUBLICATIONS

"IBM Watson Dialog Service", [online], [retrieved on Aug. 30, 2017]. Retrieved from the Internet <URL: https://www.ibm.com/watson/developercloud/dialog.html>, all pages.

"Welcome to the 419 Eater", [online], [retrieved on Aug. 30, 2017]. Retrieved from the Internet <URL: http://www.419eater.com/html/letters.htm>, all pages.

\* cited by examiner

SYSTEM TO PREVENT SCAMS

BACKGROUND

The present exemplary embodiments pertain to scams which target people rather than computer systems and, more particular, to counteracting such scams by scam baiting.

We live in a rapidly expanding cyberworld that can provide access to information and commerce never before available electronically, but it is also home to digital thieves. These digital thieves are a new breed of criminals attempting to steal identity, information, time and money from unsuspecting computer users.

These digital thieves use a lot of tools and techniques to gain "easy money". One of the most used methods is deception or scam as it requires little to no technical knowledge to create an attack.

There are hundreds of different scams out there including but not limited to the Nigerian scam 419, lottery scam, investment, credits, auctions and the list keeps growing.

BRIEF SUMMARY

The various advantages and purposes of the exemplary embodiments as described above and hereafter are achieved by providing, according to an aspect of the exemplary embodiments, a computer-implemented method for deterring scams comprising: monitoring by a cognitive engine agent incoming messages for scam messages; receiving by an messaging server an incoming message having a sender of the incoming message; identifying by the cognitive engine agent the incoming message as a scam message; replying by the cognitive engine agent in cooperation with the messaging server to the scam message by initiating an message conversation with the sender of the scam message, the message conversation comprising one or more reply messages to the sender of the scam message replying to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages; wherein the method is performed by one or more computer processors.

According to another aspect of the exemplary embodiments, there is provided a smart system to prevent scams comprising: a messaging server; a cognitive system through natural language understanding to understand and interpret text messages and create a personalized response to the text messages so as to intelligently interact with a sender of the message; a cognitive engine agent in cooperation with the cognitive system to monitor incoming messages received by the messaging server for scam messages, identify the incoming message as a scam message, and reply through the messaging server to the scam message; at least one non-transitory storage medium that stores instructions; at least one processor that executes the instructions to: monitor by the cognitive engine agent incoming messages for scam messages; receive by the cognitive engine agent through the messaging server an incoming message; identify the incoming message as a scam message; reply by the cognitive engine agent in cooperation with the messaging server to the scam message to initiate a message conversation with the sender of the scam message, the message conversation comprising one or more reply messages to the sender of the scam message that reply to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages.

According to a further aspect of the exemplary embodiments, there is provided a computer program product for deterring scams, the computer program product comprising a nontangible computer readable storage medium having program instructions embodied therewith, the program instructions executable by a computer to cause the computer to perform a method comprising: monitoring by a cognitive engine agent incoming messages for scam messages; receiving by an messaging server an incoming message having a sender of the incoming message; identifying by the cognitive engine agent the incoming message as a scam message; and replying by the cognitive engine agent in cooperation with the messaging server to the scam message by initiating an message conversation with the sender of the scam message, the message conversation comprising one or more reply messages to the sender of the scam message replying to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
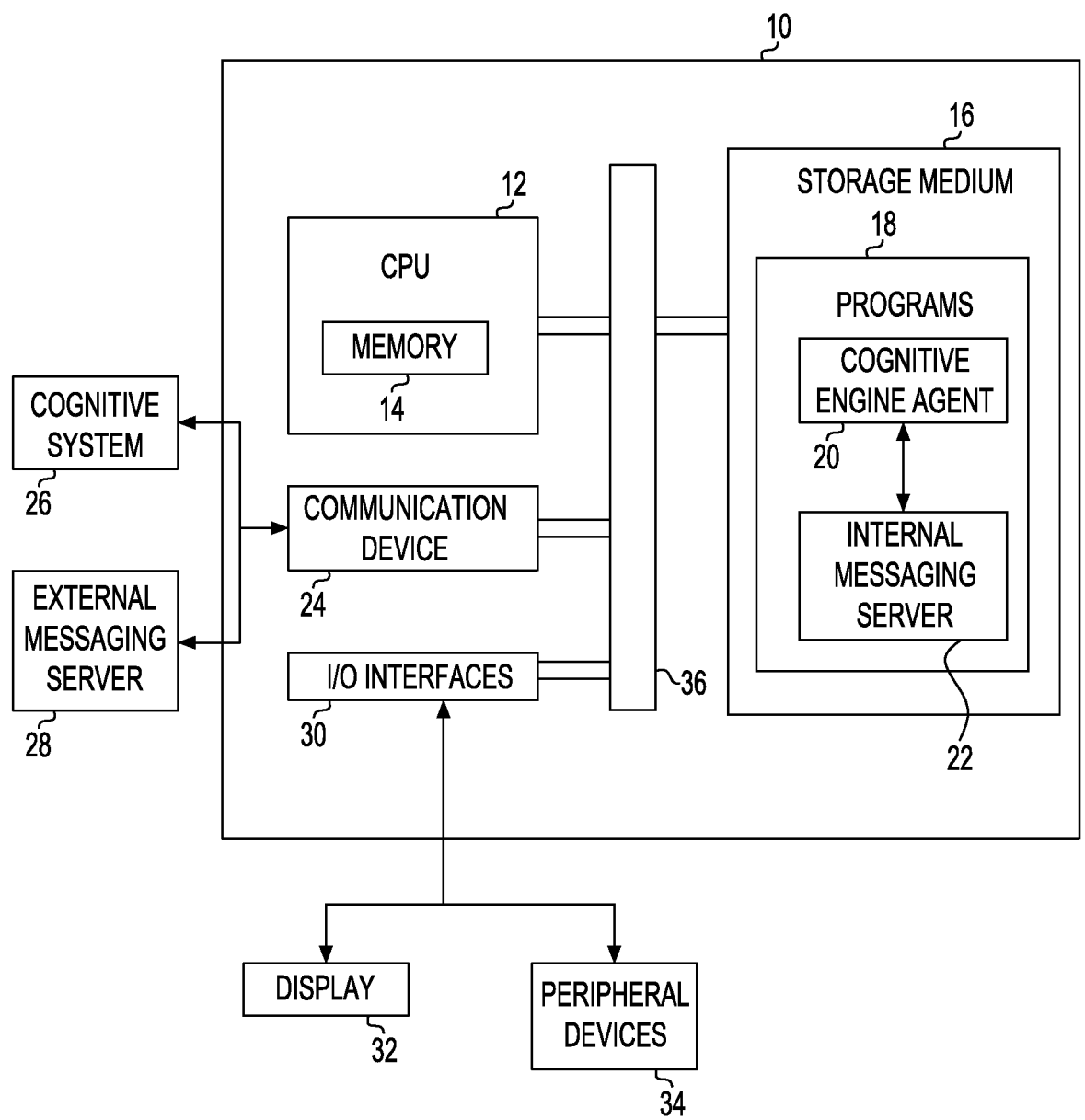
FIG. 1 is an illustration of a computer system for use in the exemplary embodiments.

Because these digital thieves are targeting people, not systems, antivirus programs and other security software are ineffective defenses. So it would appear that there is no technology that can reduce or prevent this criminal behavior.

However, there is one simple and effective deterrent but it is time consuming and requires human interaction with the cyber thief. Such an effective deterrent is called scam baiting. Scam baiting is engaging into a dialogue with the scammers while posing as a potential victim with the intent to waste their time and resources, which reduces the time and resources they have available to engage more acts of digital deception. In other words, the more time they believe they have a successful scam underway, the less time they can be contacting others to perpetuate their scams. Scam baiting may also gather information that will be of use to authorities, and publicly expose the scammer.

While scam baiting can be an effective deterrent against scammers, the problem is that scam baiting has a major constraint which is that there are a limited number of people willing or interested in investing the time required to engage with the scammer, and therefore the scammers greatly outnumber the scam baiting community.

One of the most prominent scams is the so-called advanced-fee scam. An advance-fee scam is a form of fraud and one of the most common types of confidence tricks. The scam typically involves promising the victim a significant share of a large sum of money, in return for a small up-front payment, which the fraudster requires in order to obtain the large sum. If a victim makes the payment, the fraudster either invents a series of further fees for the victim, or simply disappears.

The exemplary embodiments are directed to other types of scams besides the advanced-fee scam. Among these other types of scams are fake charities, dating and romance, buying or selling, jobs and investment, attempts to gain your personal information and threats and extortion, to name a few.

In the fake charities scam, scammers may impersonate genuine charities and ask for donations or contact the victim claiming to collect money for relief efforts after natural disasters.

In the dating and romance scam, scammers may take advantage of people looking for romantic partners, often via dating websites, apps or social media by pretending to be prospective companions. These scammers play on emotional triggers to get the victim to provide money, gifts or personal details.

In the buying or selling scam, scammers may prey on consumers and businesses that are buying or selling products and services. Not every transaction is legitimate.

In the jobs and investment scam, scammers have invented all sorts of fake money-making opportunities to prey on the victim's enthusiasm and get hold of the victim's cash.

In the attempts to gain a victim's personal information, scammers use all kinds of sneaky approaches to steal the victim's personal details. Once obtained, scammers can use the victim's identity to commit fraudulent activities such as using the victim's credit card or opening a bank account.

In the threats and extortion scam, scammers will use any means possible to steal the victim's identity or the victim's money—including threatening the victim's life or "hijacking" the victim's computer.

The exemplary embodiments apply to any electronic textual messaging system including but not limited to email, SMS messages and Speech to Text systems where a scam phone call, such as in a Voice Over IP (VOIP) system may be converted to a text message on the fly. Any reference to message shall include email, SMS messages and Speech to Text messages.

The scammers target people using social engineering and there presently are no technological solutions available against these kinds of scam attacks. A technological solution proposed is to use a cognitive engine with scam baiting to fight the scammers. The cognitive engine may identify scam messages. There are many sources that may be used to identify scam messages including but not limited to friendly websites, triggered by users, forums, SPAM engines, blogs, guestbooks, known scammers' messages and honeypot message accounts. The cognitive engine may then send back messages to the scammers using natural language to keep the scammer busy thinking they are scamming a real person, while in reality they are wasting their time talking with a computer.

The exemplary embodiments have several advantages. One advantage is that the number and frequency of the attacks may be reduced by keeping the attackers busy.

Another advantage is that the scammers may eventually become discouraged because it will be difficult for the scammer to determine if they are talking with a human or a computer and therefore the amount of scams and scammers may eventually decrease.

A further advantage is that the exemplary embodiments may create a black list of message addresses used by scammers so that any message received from this black list of message addresses would be suspicious. Additionally, the exemplary embodiments may create patterns based on the body of the scam message which may also be used to detect future scams. These patterns may be shared with SPAM and security companies to help them to identify new threads.

Referring to the Figures in more detail, and particularly referring to FIG. 1, there is an illustration of a computer system 10 for use in the exemplary embodiments. The computer system 10 may include a central processing unit (CPU) 12 having memory 14. The computer system 10 may further include a storage medium 16 within computer system 10 or remotely connected to it or both. The storage medium 16 may include the programs 18 necessary to operate the computer system such as an operating system (not shown) but may also include a cognitive engine agent 20 that could be connected to an internal messaging server 22.

The Internal Messaging Server 22 refers to a message server like Exchange®, EXIM®, ZIMBRA®, etc, that is loaded on the same computer where the cognitive engine agent 20 is loaded.

Communication between the computer system 10 and external components may be by a communication device 24 which is capable of communicating with external components through the internet and may include additional capabilities such as WiFi, WAN, LAN, Bluetooth® short range radio, cellular and satellite, to name a few.

The cognitive engine agent 20, which may also be referred to as a bot, works in conjunction with a cognitive system 26, which may be located within the same computer system 10 or external to it, to provide natural language capability to interact with scam messages. In addition, the cognitive engine agent 20 and cognitive system 26 may be integrated so as to run as a single entity on computer system 10. If located external to computer system 10, the cognitive system 24 may connect to the computer system 10 through communication device 24.

Additionally, the cognitive engine agent 20 may be connected to external messaging server 28 to gather, send and receive messages, as well as other related tasks.

The External Messaging Server 28 refers to an external messaging server/service like Outlook®, Gmail®, etc. The connection with those servers/services will be handled by the communication device 24.

Figure 2:
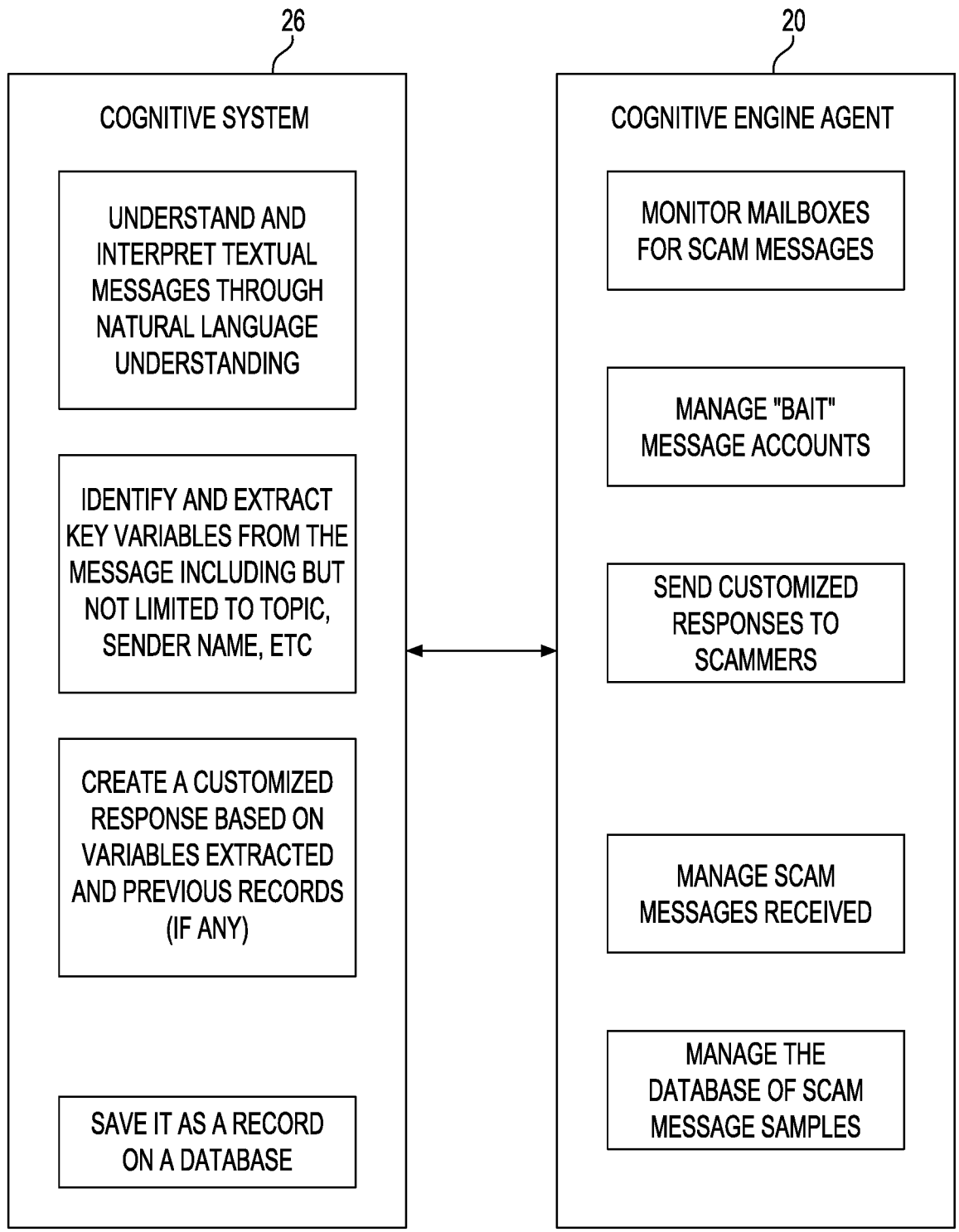
FIG. 2 is an illustration of the relationship between the cognitive engine agent and the cognitive system.

The relationship between the cognitive engine agent 20 and the cognitive system 26 is illustrated in more detail in FIG. 2. Among other functions, the cognitive system 26 is able to understand and interpret the messages received through natural language understanding, identify and extract several characteristics (parameters or variables) from the messages and create a personalized response that will be used to "intelligently interact" with the message sender (by creating natural language dialogues). All of the foregoing may be saved as a record on a database.

By "intelligently interact", it is meant that there are no pre-written scripts for the cognitive system 26 to use. Rather, the cognitive system 26 creates replies based on the natural language understanding of the sender's message. One such cognitive system 26 may be Watson™ (available from IBM Corporation) which is an artificial intelligence platform. The cognitive engine agent 20 has APIs (Application Program Interface) instructions which may enable the cognitive engine agent 20 to extend the capability of Watson™ to the exemplary embodiments.

Examples of the APIs that may be used by the system are: Watson Natural Language Classifier™, Watson Language Translator™, Watson Natural Language Understanding™, Watson Retrieve and Rank™, Watson Personality Insights™, Watson Tone Analyzer™, and any other API available that may be used to better understand the scam message and create a better response.

Additionally, the cognitive system 26 will save those scam messages to keep a record of the responses which may be used for analytics as well as for the creation of more tailored responses.

In addition to other functions, the cognitive engine agent 20 may monitor mailboxes for scam messages, manage "bait" message accounts, send customized responses to scammers, manage scam messages received and manage a database of scam message samples.

Referring back to FIG. 1, the computer system 10 may further include I/O interfaces 30 for connecting to external devices such as a display 32 and other peripheral devices 34 such as a printer.

The computer system 10 may further include a bus 36 for internally connecting all of the computer systems' components together.

Figure 3:
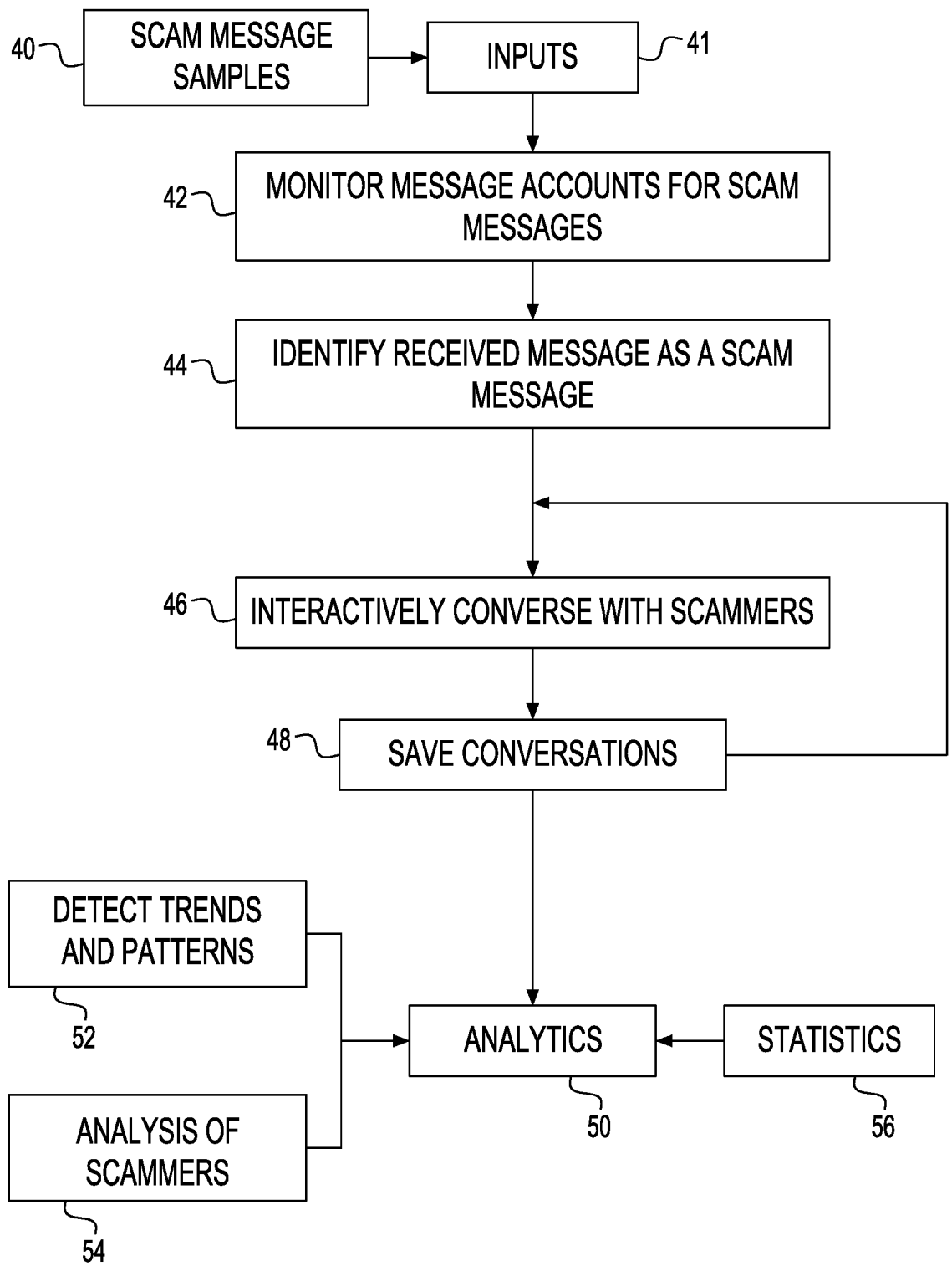
FIG. 3 is an illustration of a method for preventing scams.

Referring to FIG. 3, there is illustrated a method for preventing scams. Initially, a set of samples of scam messages 40 may be loaded as inputs, box 41, into the cognitive engine agent 20. These are scam message samples that may be obtained from internet sources such as web sites, blogs, forums, etc. This task may be automated by using advanced tools like Watson Alchemy™ or any other similar web crawler. The cognitive engine agent 20 may monitor a user's message accounts for potentially scam messages, box 42.

The scam message may come either from the internal messaging server 22 or the external messaging server 28, or both.

The cognitive engine agent 20 may identify the potentially scam message as a scam message based on the natural language understanding capability through the cognitive system 26 and the scam message samples, box 44. The cognitive engine agent 20 will check each message and compare it against the database of scam message samples to look for similarities. Then, the message may be scored based on how similar it is against the loaded samples, and if the confidence level is above a predetermined threshold, for example 90%, then the cognitive engine agent 20 will flag the message as a scam message.

Once the received message is determined to be a scam message, the cognitive system 26 may interactively converse with the scam message sender thru the cognitive engine agent 20, box 46. The interactive conversation may continue with the scam message sender until the scam message sender no longer responds to messages from the cognitive engine agent 20.

Additionally, the system may be configured to send a predetermined number of reminders to the scammer to encourage the scammer to reply back to the message. The conversation may be ended if the scammer does not reply after the predetermined number of reminders.

After the conversation has run its course, the conversation may be saved in storage medium 16 for further analysis box 48, or to improve further conversations, the conversation may loop back to interactively converse with the scammers, box 46.

Analytics, box 50, may be performed by the cognitive system 26 on the saved conversation. Among the analytics may be to detect trends and patterns in the scam messages, box 52, analysis of the available information and metadata about scammers such as location, alias, message addresses, contact information, box 54, and statistics such as types of scams and number of incidents, box 56.

Figure 4:
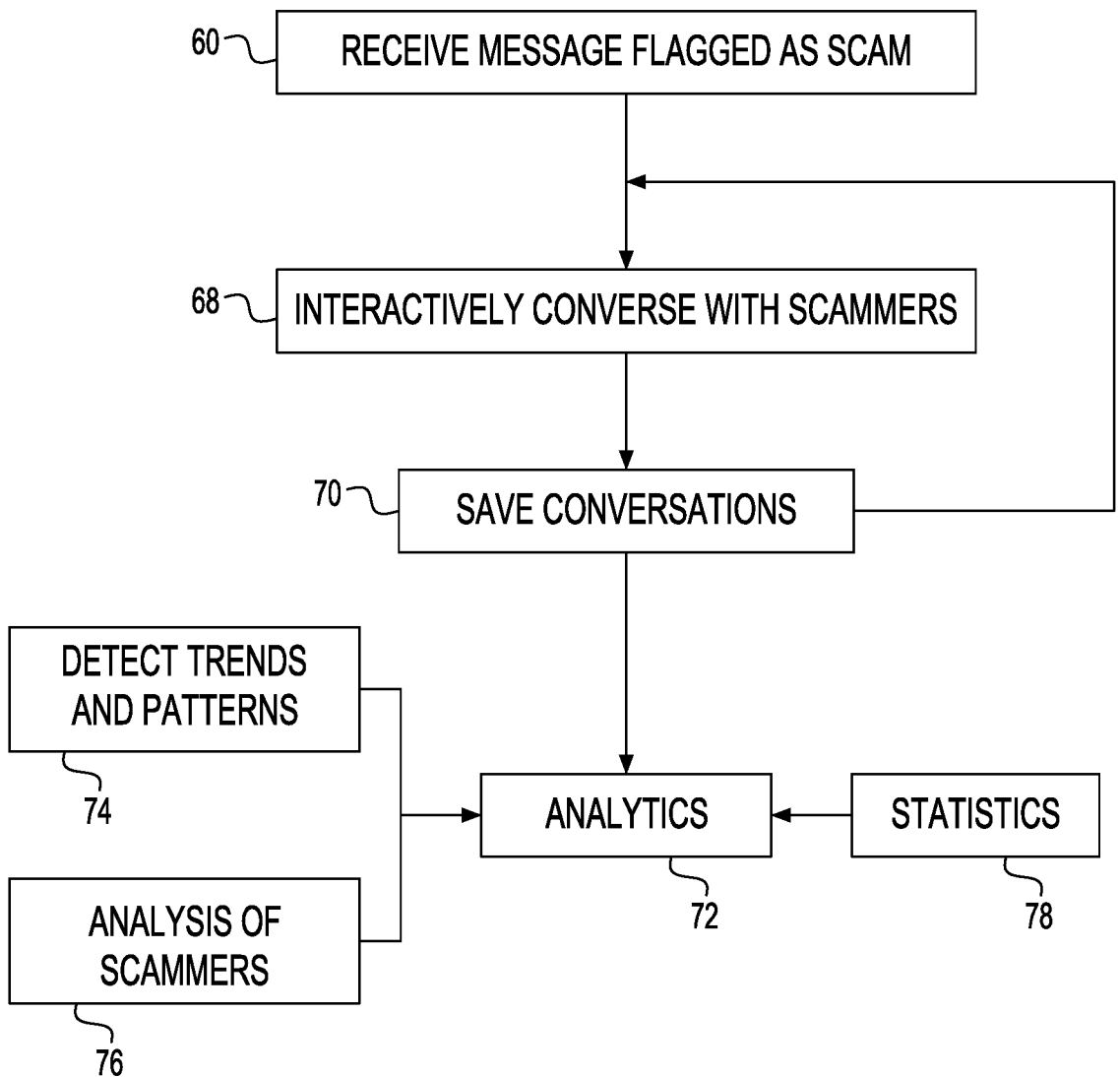
FIG. 4 is an illustration of another method for preventing scams.

Referring to FIG. 4, there is illustrated another method for deterring scams. The cognitive engine agent 20 receives a message flagged as "scam" by an automated system (like an anti-SPAM engine), box 60.

Then, the cognitive engine agent 20 may interactively converse with the scam message sender, box 68, as described previously.

After the conversation has run its course, the conversation may be saved for further analysis box 70, or to improve further conversations, the conversation may loop back to interactively converse with the scammers, box 68.

Analytics, box 72, may be performed by the cognitive system 26 on the saved conversation. Among the analytics may be to detect trends and patterns in the scam messages, box 74, analysis of the available information and metadata about scammers such as location, alias, message addresses, contact information, box 76, and statistics such as types of scams and number of incidents, box 78.

Figure 5:
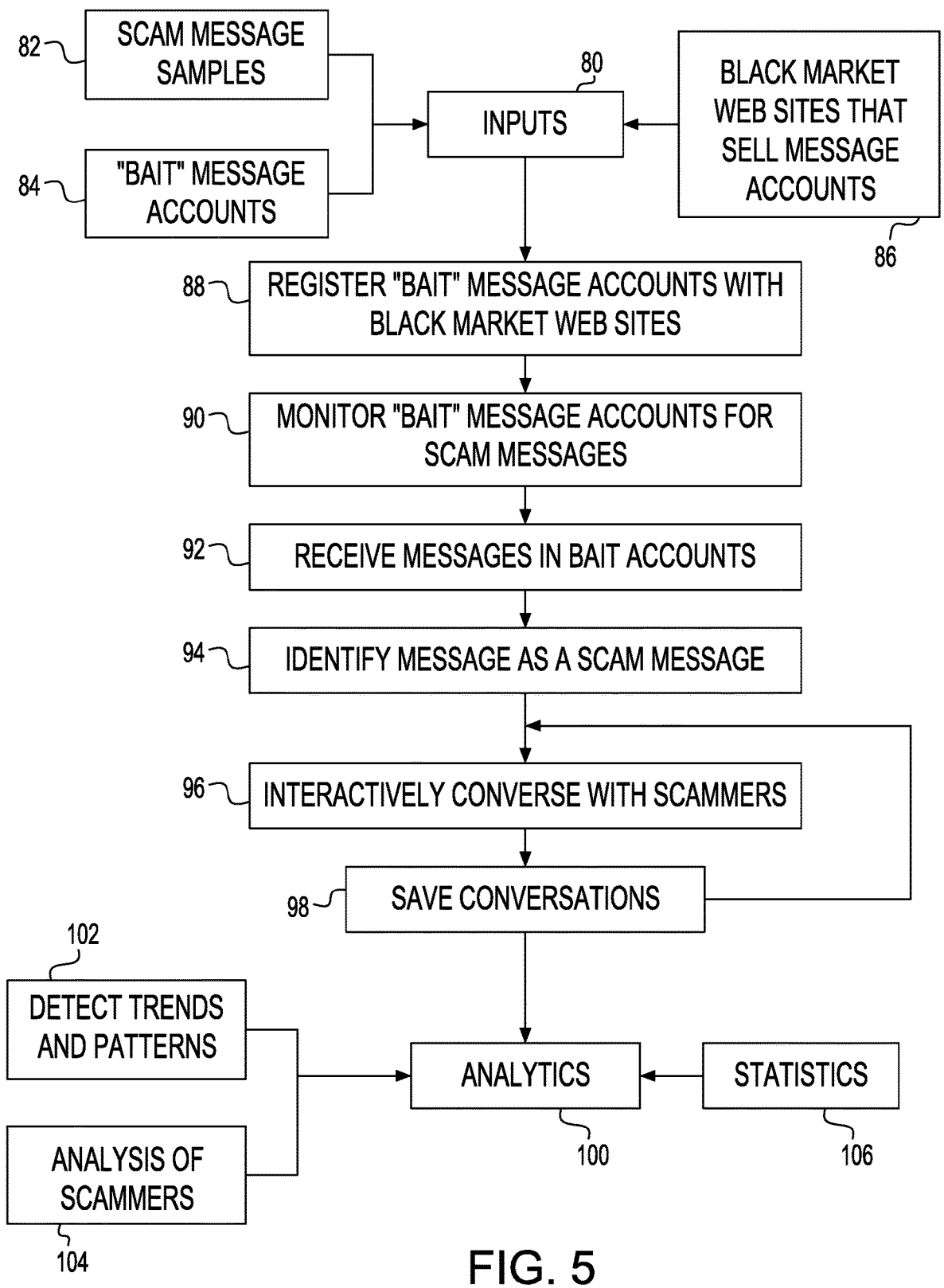
FIG. 5 is an illustration of a further method for preventing scams.

Referring to FIG. 5, there is illustrated another method for deterring scams. The cognitive engine agent 20 may be loaded with various inputs, box 80. Among these inputs may be scam message samples, box 82. These are scam message samples that may be obtained from internet sources such as web sites, blogs, forums, etc. This task may be automated by using advanced tools like Watson Alchemy™ or any other similar web crawler. Another input may be message accounts that may be used as "bait" to scam the scammers, box 84. These message accounts may be message accounts that are used just for the purpose of scamming the scammers and may be used for no other purpose so as to isolate the scam messages from the user's regular message traffic. Another input may be black market web sites that sell vulnerable message accounts, box 86. These black-market web sites are malicious web sites that sell bulk message accounts to scammers (mostly from users that filled some web form or registration).

The cognitive engine agent 20 may register the "bait" message accounts with the black-market web sites found above, box 88, so as to increase the likelihood of receiving scam messages from the scammers that use those sites to gather new target messages.

The cognitive engine agent 20 may monitor the "bait" message accounts for potentially scam messages, box 90.

The internal messaging server 22 may receive messages in the "bait" message accounts, box 92, one or more of the messages which may be a scam message.

The cognitive engine agent 20 may identify a potential scam message as a scam message based on several conditions, including but not limited to: the header, body, sender, IP, location, and any other message metadata from the pre-loaded database of scam message samples, as well as the fact that the potentially scam message was received in one of the "bait" message accounts, box 94.

Once the received message is determined to be a scam message, the cognitive engine agent 20 may interactively converse with the scam message sender, box 96, as described previously.

After the conversation has run its course, the conversation may be saved for further analysis box 98, or to improve further conversations, the conversation may loop back to interactively converse with the scammers, box 96.

Analytics, box 100, may be performed by the cognitive system 26 on the saved conversation. Among the analytics may be to detect trends and patterns in the scam messages, box 102, analysis of the available information and metadata about scammers such as location, alias, message addresses, contact information, box 104, and statistics such as types of scams and number of incidents, box 106.

The cognitive engine agent 20 through the cognitive system 26 has the capability to utilize machine learning to grow the subject matter expertise to become smarter in dealing with scam messages and evolve along with the scammers to spot new types of scam messages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method for deterring scams comprising:
    loading at least one bait message account and black-market web sites that sell message accounts;
    registering the at least one bait message account with the black-market web sites that sell message accounts to increase a likelihood of receiving scam messages in the at least one bait message account from scammers that use the black-market web sites to gather new target message accounts;
    monitoring by a cognitive engine agent incoming messages for the at least one bait message account;
    monitoring by the cognitive engine agent incoming messages for scam messages;
    receiving by a messaging server an incoming message having a sender of the incoming message;
    identifying by the cognitive engine agent the incoming message as a scam message comprising identifying incoming messages for the at least one bait message account as scam messages;
    replying by the cognitive engine agent in cooperation with the messaging server to the scam message by initiating a message conversation with the sender of the scam message, the message conversation comprising one or more reply messages to the sender of the scam message replying to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages;
    wherein the method is performed by one or more computer processors.

2. The computer-implemented method of claim 1 further comprising communicating by the cognitive engine agent with a cognitive system, the cognitive system through natural language understanding, understanding and interpreting textual messages and creating a personalized response to the text messages so as to intelligently interact with the sender of the message.

3. The computer-implemented method of claim 1 further comprising:
    receiving a reply scam message responsive to the reply mail;
    replying by the cognitive engine agent to the reply scam message with a further reply message responsive to the content of the scam embodied in the reply scam message, the further reply message being an intelligent, interactive message using natural unscripted language to appear as if the further reply message was written by a human.

4. The computer-implemented method of claim 1 further comprising saving the scam messages and analyzing the scam messages for one or more of: detect trends and patterns, available information about scammers who propagate scam messages and statistics about scams including types of scams and number of incidents of scams.

5. The computer-implemented method of claim 4 further comprising:
    inputting the results of analyzing for a machine learning component to grow a subject matter expertise and evolve along with the scammers to spot new types of scam messages.

6. The computer-implemented method of claim 1 further comprising loading samples of scam messages and
    wherein identifying by the cognitive engine agent comprising comparing the incoming message to the loaded samples of scam messages as a basis for identifying the incoming message for the at least one bait message account as the scam message.

7. A smart system to deter scams comprising:
    a messaging server;
    a cognitive system through natural language understanding to understand and interpret text messages and create a personalized response to the text messages so as to intelligently interact with a sender of the message;
    a cognitive engine agent in cooperation with the cognitive system to monitor incoming messages received by the messaging server for scam messages, identify the incoming message as a scam message, and reply through the messaging server to the scam message;
    at least one non-transitory storage medium that stores instructions;
    at least one processor that executes the instructions to:
    load samples of scam messages, load at least one bait message account and load black-market web sites that sell message accounts;
    register the at least one bait message account with the black-market web sites to increase a likelihood of receiving scam messages in the at least one bait message account from scammers that use the black-market web sites to gather new target message accounts;
    monitor incoming messages for scam messages for the at least one bait message account;
    monitor by the cognitive engine agent incoming messages for scam messages;
    receive by the cognitive engine agent through the message server an incoming message;
    identify the incoming message in the at least one bait message account as a scam message comprising compare the loaded samples of scam messages as a basis for identifying the incoming message for the at least one bait message account as the scam message;
    reply by the cognitive engine agent in cooperation with the messaging server to the scam message to initiate a message conversation with the sender of the scam message, the message conversation comprising one or more reply messages to the sender of the scam message that reply to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages.

8. The smart system of claim 7 further comprising saving the scam messages and analyze the scam messages for one or more of: detect trends and patterns, available information about scammers who propagate scam messages and statistics about scams including types of scams and number of incidents of scams.

9. The smart system of claim 8 further comprising inputting the results of analyze for a machine learning component to grow the subject matter expertise and evolve along with the scammers to spot new types of scam messages.

10. The smart system of claim 7 wherein the cognitive engine and the cognitive system run as a single entity on the smart system.

11. The smart system of claim 7 wherein the cognitive system identifies and extracts key variables from the messages selected from the group consisting of topic, sender, body, name, message and location and wherein the personalized response to the text messages is customized using the key variables extracted.

12. A computer program product for deterring scams, the computer program product comprising a non-transitory computer readable storage medium having program instructions embodied therewith, the program instructions executable by a computer to cause the computer to perform a method comprising:
loading at least one bait message account and black-market web sites that sell message accounts;
registering the at least one bait message account with the black-market web sites that sell message accounts to increase a likelihood of receiving scam messages in the at least one bait message account from scammers that use the black-market web sites to gather new target message accounts;
monitoring by a cognitive engine agent incoming messages for the at least one bait message account;
monitoring by the cognitive engine agent incoming messages for scam messages;
receiving by a messaging server an incoming message having a sender of the incoming message;
identifying by the cognitive engine agent the incoming message as a scam message comprising identifying incoming messages for the at least one bait message account as scam messages;
replying by the cognitive engine agent in cooperation with the messaging server to the scam message by initiating a message conversation with the sender of the scam message, the message conversation comprising one or more reply messages to the sender of the scam message replying to the scam message and any subsequent scam messages from the sender of the scam message with each reply message being an intelligent, interactive message using natural unscripted language to appear as if the one or more reply messages was written by a human and is responsive to a content of a scam embodied in the scam message and any subsequent scam messages.

13. The computer program product of claim 12 further comprising:
receiving a reply scam message responsive to the reply mail;
replying by the cognitive engine agent to the reply scam message with a further reply message responsive to the content of the scam embodied in the reply scam message, the further reply message being an intelligent, interactive message using natural unscripted language to appear as if the further reply message was written by a human.

14. The computer program product of claim 12 further comprising communicating by the cognitive engine agent with a cognitive system, the cognitive system through natural language understanding, understanding and interpreting text messages and creating a personalized response to the text messages so as to intelligently interact with a sender of the message.

* * * * *